(12) United States Patent
Gelman et al.

(10) Patent No.: US 9,866,835 B2
(45) Date of Patent: Jan. 9, 2018

(54) BOREHOLE IMAGE COMPRESSION (71) Applicant: Schlumberger Technology Corporation, Sugar Land, TX (US)

(72) Inventors: Andriy Gelman, Somerville, MA (US); Julius Kusuma, Arlington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 199 days.

(21) Appl. No.: 14/765,341

(22) PCT Filed: Feb. 7, 2014

(86) PCT No.: PCT/US2014/015231
§ 371 (c)(1),
(2) Date: Aug. 2, 2015

(87) PCT Pub. No.: WO2014/124215
PCT Pub. Date: Aug. 14, 2014

(65) Prior Publication Data
US 2015/0381981 A1 Dec. 31, 2015

Related U.S. Application Data (60) Provisional application No. 61/762,028, filed on Feb. 7, 2013.

(51) Int. Cl.
*G06K 9/00* (2006.01)
*G06K 9/46* (2006.01)
(Continued)

(52) U.S. Cl.
CPC ......... *H04N 19/12* (2014.11); *E21B 47/0002* (2013.01); *G01V 1/46* (2013.01);
(Continued)

(58) Field of Classification Search
None
See application file for complete search history.

(56) References Cited

U.S. PATENT DOCUMENTS

| | | | | |
|---|---|---|---|---|
| 5,535,286 A | * | 7/1996 | Ibbotson | G06T 7/68 |
| | | | | 348/85 |
| 2004/0114822 A1 | * | 6/2004 | Tabesh | G06T 9/005 |
| | | | | 382/248 |

(Continued)

FOREIGN PATENT DOCUMENTS

EP 0398581 11/1990

OTHER PUBLICATIONS

M. Vetterli, et al, "Wavelets and Subbannd Coding," at http://www.waveletsandsubbandcoding.org/otherbooks.htm, retrieved on Jul 30, 2015.

(Continued)

*Primary Examiner* — Sean Conner
(74) *Attorney, Agent, or Firm* — Michael Dae

(57) ABSTRACT

Devices and methods for obtaining borehole images at a surface installation while a borehole-imaging downhole tool is logging a borehole are provided. One such method may involve, while the downhole tool is disposed in the borehole, obtaining a first borehole image at a first depth of investigation using the borehole-imaging downhole tool. Compression electronics may compress the first borehole image to obtain a first compressed borehole image. Compressing the first borehole image may involve exploiting a symmetry characteristic of the first borehole image to increase compression efficiency or exploiting a similarity of the first borehole image with a second borehole image to increase compression efficiency, or both. The compressed borehole image then may be efficiently transmitted to the surface installation via a telemetry system.

16 Claims, 10 Drawing Sheets

(51) Int. Cl.
    *H04N 19/12*     (2014.01)
    *G01V 1/46*     (2006.01)
    *G01V 11/00*     (2006.01)
    *E21B 47/00*     (2012.01)
    *H04N 19/503*     (2014.01)
    *H04N 19/172*     (2014.01)
    *H04N 19/63*     (2014.01)
    *H04N 19/136*     (2014.01)
    *H04N 19/85*     (2014.01)
    *H04N 19/88*     (2014.01)

(52) U.S. Cl.
    CPC ......... *G01V 11/002* (2013.01); *H04N 19/136* (2014.11); *H04N 19/172* (2014.11); *H04N 19/503* (2014.11); *H04N 19/63* (2014.11); *H04N 19/85* (2014.11); *H04N 19/88* (2014.11)

(56) References Cited

U.S. PATENT DOCUMENTS

| | | |
|---|---|---|
| 2006/0015256 A1 | 1/2006 | Hassan et al. |
| 2006/0274956 A1* | 12/2006 | Sohn .................. H04N 19/176 382/238 |
| 2008/0024513 A1* | 1/2008 | Raveendran ............ G06T 5/007 345/589 |
| 2008/0130755 A1* | 6/2008 | Loukas ................ H04N 19/119 375/240.24 |
| 2008/0304695 A1* | 12/2008 | Holm ...................... G06T 5/009 382/100 |
| 2009/0167556 A1 | 7/2009 | Signer et al. |
| 2009/0190850 A1* | 7/2009 | Tang ...................... G01V 11/00 382/251 |
| 2009/0254281 A1* | 10/2009 | Hruska .................. G01V 11/00 702/7 |
| 2012/0082359 A1* | 4/2012 | Arditi ...................... A61B 8/06 382/131 |
| 2014/0009574 A1* | 1/2014 | Hannuksela ..... H04N 19/00769 348/42 |

OTHER PUBLICATIONS

K. Ramchandran, et al., "Best wavelet packet bases in a rate-distortion sense," Image Processing IEEE Transactions on, vol. 2, No. 2, pp. 16-175, Apr. 1993.

D. Taubman, "High performance scalable image compression with EBCOT," Image Processing, IEEE Transactions on, vol. 9, No. 7, pp. 1158-1170, Jul. 2000.

I.H. Witten, et al, "Arithmetic coding for data compression," Communication of the ACM, vol. 30, No. 6, Jun. 1987, pp. 520-540.

* cited by examiner

$A[x, y] = (L[x, y] + R[-x, y])/\sqrt{2}$

FIG. 13

$D[x, y] = (L[x, y] + R[-x, y])/\sqrt{2}$

BOREHOLE IMAGE COMPRESSION

CROSS-REFERENCE TO RELATED APPLICATION

This application claims the benefit of and priority to U.S. Provisional Application No. 61/762,028, "BOREHOLE IMAGE COMPRESSION," filed on Feb. 7, 2013, which is incorporated by reference herein in its entirety for all purposes.

BACKGROUND

This disclosure relates to compression of borehole images obtained by a downhole tool.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions.

A variety of downhole tools may collect information about a borehole drilled into a geological formation. Some downhole tools may obtain information about the geological formation in a format that may be referred to as "borehole images." A variety of tools may obtain borehole images, including resistivity tools, acoustic tools, and caliper tools, to name a few. The borehole images may be used for well placement, borehole integrity monitoring, and many other drilling and measurement circumstances. As such, it may be desirable that good quality images be available at the surface even while the downhole tool is logging the borehole.

Although it may be desirable to obtain the results of the borehole imaging substantially in real time while the downhole tool is logging the borehole, the telemetry link between the downhole tool and the surface may have limited communication bandwidth. Indeed, the bandwidth of both mud pulse telemetry and electromagnetic telemetry may be very limited, and even with higher-bandwidth telemetry such as Wired Drill Pipe, it may be desirable to use the data rate as efficiently as possible. As such, the borehole images may be compressed before being transferred to the surface. The state of the art in image compression, however, is generally specialized for natural images (e.g., JPEG compression). Image compression associated with natural images is used on borehole images, but the resulting compressed images may still exceed a desired data transfer size and/or cannot efficiently represent features relevant to borehole imaging. Moreover, compression associated with natural images may have performance that is impacted by the small number of azimuthal samples that may be found in a borehole image (e.g., 80 bins in some cases). Using such image compression may therefore limit the amount of borehole imagery that may be provided to the surface while the downhole tool is logging the borehole.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

This disclosure relates to devices and methods for obtaining borehole images at a surface installation while a borehole-imaging downhole tool is logging a borehole. One such method may involve, while the downhole tool is disposed in the borehole, obtaining a first borehole image at a first depth of investigation using the borehole-imaging downhole tool. Compression electronics may compress the first borehole image to obtain a first compressed borehole image. Compressing the first borehole image may involve exploiting a symmetry characteristic of the first borehole image to increase compression efficiency or exploiting a similarity of the first borehole image with a second borehole image to increase compression efficiency, or both. The compressed borehole image then may be efficiently transmitted to the surface installation via a telemetry system.

In another example, a method for obtaining borehole images at a surface installation while a borehole-imaging downhole tool is logging a borehole may include, while the downhole tool is disposed in the borehole, receiving a first compressed borehole image at the surface installation via a telemetry system. A first borehole image may be reconstructed from the first compressed borehole image based at least in part on a symmetry characteristic of the first borehole image or a similarity of the first borehole image with a second borehole image, or both.

In another example, a downhole tool may include one or more borehole imaging components that may obtain one or more borehole images. Compression electronics may compress the one or more borehole images based at least in part on a symmetry characteristic of the one or more borehole images or a similarity of a first of the one or more borehole images with a second of the one or more borehole images, or both. The downhole tool may also include a telemetry system that may transmit the compressed one or more borehole images to a surface installation.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Furthermore, it should be noted that in the development of any such actual embodiment, numerous implementation— specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

A variety of well logging tools may obtain borehole images that describe characteristics of a borehole of a well at various depths. In many cases, it is desirable to obtain at least some of the borehole images as the tool is logging the well. Some of the borehole images may be obtained substantially in real time as they are being collected. Because telemetry links between the downhole tool and the surface may have limited bandwidth over which the borehole images may be transmitted, this disclosure provides systems and methods for compressing the borehole images. These systems and methods may exploit certain characteristics associated with borehole images, such as borehole image symmetry and/or the appearance of similar elements in multiple depths of investigation (DOI), to improve image compression while preserving image quality.

Figure 1:
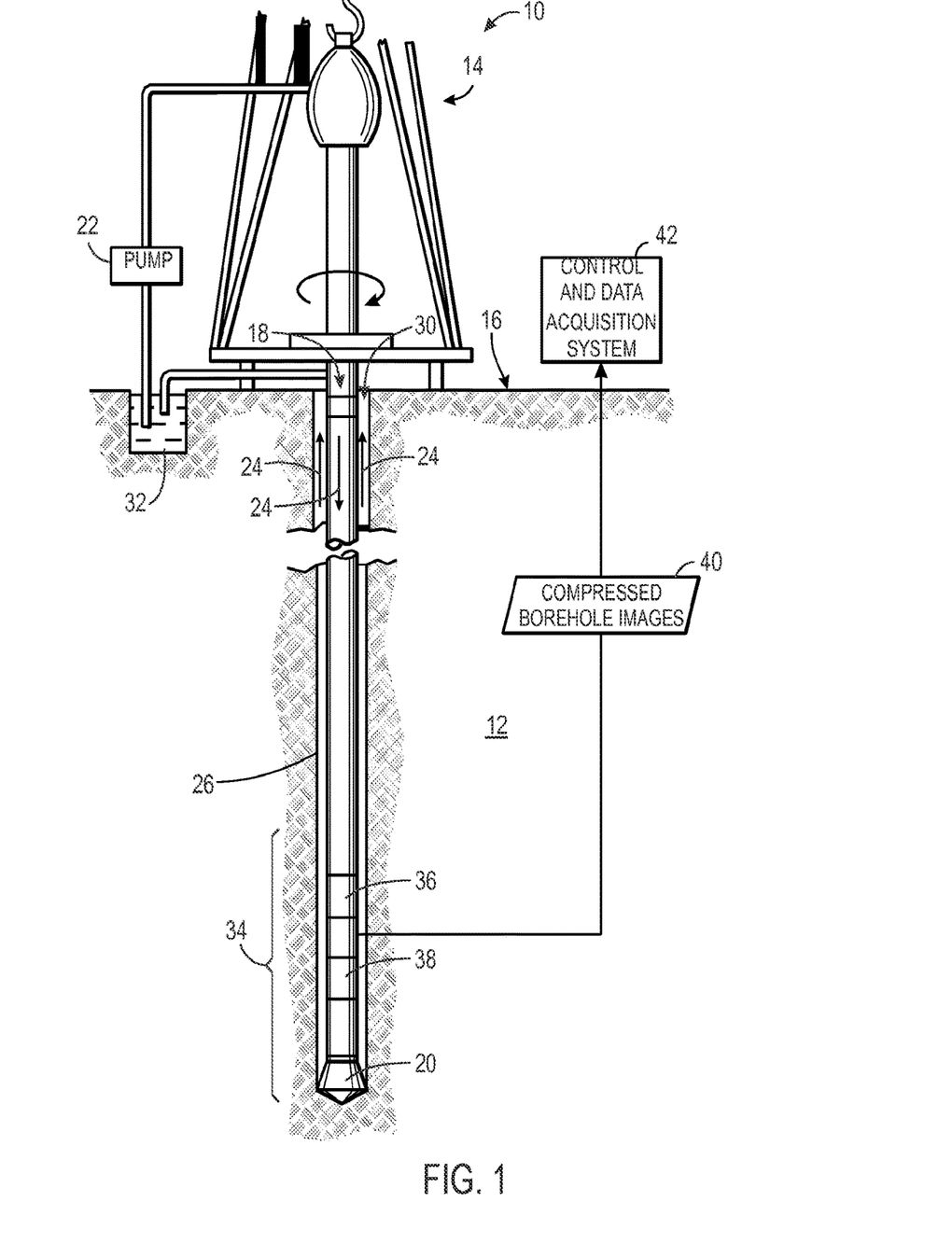
FIG. 1 is a system for obtaining borehole images that are compressed and sent to the surface while a borehole is being logged, in accordance with an embodiment.

With the foregoing in mind, FIG. 1 illustrates a drilling system 10 that includes a borehole imaging tool that efficiently compresses the borehole images before sending the images uphole to the surface. The drilling system 10 may be used to drill a well into a geological formation 12 and obtain borehole images useful to identify characteristics of the well. In the drilling system 10, a drilling rig 14 at the surface 16 may rotate a drill string 18 having a drill bit 20 at its lower end. As the drill bit 20 is rotated, a drilling fluid pump 22 is used to pump drilling fluid 24, referred to as "mud" or "drilling mud," downward through the center of the drill string 18 in the direction of the arrow to the drill bit 20. The drilling fluid 24, which is used to cool and lubricate the drill bit 20, exits the drill string 18 through the drill bit 20. The drilling fluid 24 then carries drill cuttings away from the bottom of a borehole 26 as it flows back to the surface 16, as shown by the arrows through an annulus 30 between the drill string 18 and the formation 12. However, as described above, as the drilling fluid flows through the annulus 30 between the drill string 18 and the formation 12, the drilling mud may begin to invade and mix with the fluids stored in the formation, which may be referred to as formation fluid (e.g., natural gas or oil). At the surface 16, the return drilling fluid 24 is filtered and conveyed back to a mud pit 32 for reuse.

As illustrated in FIG. 1, the lower end of the drill string 18 includes a bottom-hole assembly (BHA) 34 that may include the drill bit 20 along with various downhole tools. The downhole tools may collect a variety of information relating to the geological formation 12 and/or the state of drilling of the well. For instance, a measurement-whiledrilling (MWD) tool 36 may measure certain drilling parameters, such as the temperature, pressure, orientation of the drilling tool, and so forth. Likewise, a logging-while-drilling (LWD) tool 38 may measure the physical properties of the geological formation 12, such as density, porosity, resistivity, borehole caliper, and so forth.

The LWD tool 38 may collect borehole images using any suitable manner. For instance, the LWD tool 38 may include a resistivity tool, such as the Microscope™ or the Microscope HD™ by Schlumberger Technology Corporation, that may collect resistivity images of the borehole at various depths of investigation (DOI). Additionally or alternatively, the LWD tool 38 may include any other suitable borehole-image-collecting tool, such as an acoustic tool, a caliper tool, or the like. The LWD tool 38 may store some of the borehole images to enable the borehole images to be recovered when the LWD tool 38 is retrieved once logging has completed. In addition, the LWD tool 38 may send some borehole images up to the surface—in some cases substantially in real time (RT), quickly after the borehole images are obtained—to enable operators to gain information regarding the borehole 26 even while the LWD tool 38 is being used to log the borehole 26. Before sending the borehole images to the surface, the LWD tool 38 may compress the images. The resulting compressed borehole images 40 may be transmitted to the surface via a control and data acquisition system 42. In one example, the control and data acquisition system 42 may transfer the compressed borehole images 40 via electrical signals pulsed through the geological formation 12 or via mud pulse telemetry using the drilling fluid 24. The compressed borehole images 40 may be reconstructed at the surface using any suitable data processing system (e.g., a processor, memory, storage, and/or a display).

The LWD tool 38 may represent any suitable tool that can obtain one or more borehole images. In an example shown in FIG. 2, the LWD tool 38 may include components to obtain resistivity measurements of the borehole 26. It should be appreciated that, although a logging-while-drilling (LWD) implementation is described by way of example in this disclosure, the borehole image compression described by this disclosure may be employed any suitable downhole tool (e.g., an acoustic tool, a caliper tool, a gamma-ray tool, or the like) that may obtain borehole images conveyed through the borehole 26 using any suitable means of conveyance (e.g., wireline, coiled tubing, and so forth).

Figure 2:
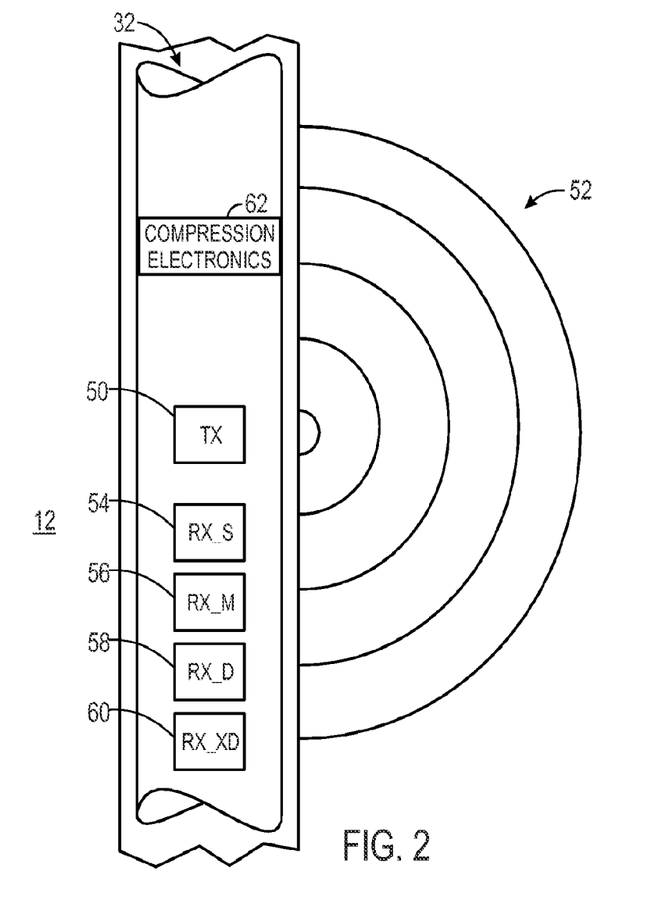
FIG. 2 is a block diagram of a borehole imaging tool, in accordance with an embodiment.

In the example of FIG. 2, a transmitter (TX) 50 may be used to investigate the formation 12 by emitting an electrical signal 52. Receivers (sometimes called buttons) placed in various locations on the LWD tool 38 may measure the signals that return to the LWD tool 38 after interacting with the formation 12. These receivers may include, for example, a shallow receiver (RX_S) 54, a medium receiver (RX_M) 56, a deep receiver (RX_D) 58, and/or an extra-deep receiver (RX_XD) 60, which may obtain borehole images at a variety of depths of investigation (DOI) substantially simultaneously. These various depths of investigation (DOI) represent how far from the LWD tool 38 the resistivity measurements reach into the formation 12. Thus, for instance, the shallow receiver (RX_S) 54 may measure the resistivity of the formation 12 at a DOI relatively close to the LWD tool 38. By contrast, the deep receiver (RX_D) 58 may measure the resistivity of the formation 12 at a DOI relatively farther out from the LWD tool 38. The receivers 54, 56, 58, and/or 60 may detect multiple azimuthal signals to construct the borehole images. In one particular example, the receivers may detect 80 azimuthal angles, producing an image that is 80 pixels wide. It should be understood, however, that this particular number of azimuthal angles detected in the borehole image is provided by way of example only. Indeed, any other suitable number of pixels of azimuthal measurements may be used.

The receivers 54, 56, 58, and/or 60 may obtain measurements of the borehole 26 in a line-by-line fashion as the LWD tool 38 is lowered or raised within the borehole 26. For instance, as the LWD tool 38 moves up or down through the borehole 26, the receivers 54, 56, 58, and/or 60 each may obtain, for each particular depth in the borehole 26, a line of 80 pixels relating to a 360° panoramic imaging of the borehole 26. A number of these lines may be stored to obtain a block of pixels that may be understood to form a borehole image. An image shown in FIG. 7, which will be discussed in greater detail below, may represent such a block of pixels that forms a borehole image.

Compression electronics 62 may store and/or compress one or more such borehole images obtained by the receivers 54, 56, 58, and/or 60 to facilitate transferring the images into the compressed borehole images 40 that may be transmitted to the surface. The compression electronics 62 may include any suitable data processing system to compress the borehole images. In some examples, the compression electronics 62 may employ a specialized or programmable hardware processor, such as an application-specific integrated circuit (ASIC) or a programmable logic device (PLD). Additionally or alternatively, the compression electronics 62 may include a processor, memory, and/or storage. For example, the processor may execute instructions stored in the memory and/or storage. As such, the memory and/or the storage of the compression electronics 62 may be any suitable article of manufacture that can store the instructions. The memory and/or the storage may be ROM memory, random-access memory (RAM), flash memory, an optical storage medium, or a hard disk drive, to name a few examples.

Figure 3:
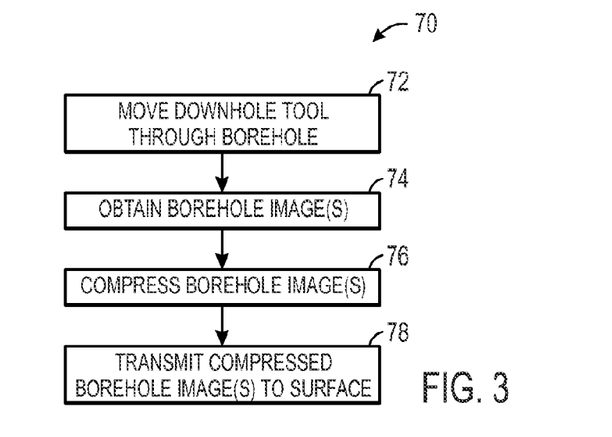
FIG. 3 is a flowchart for logging a borehole using the system of FIG. 1, in accordance with an embodiment.

The LWD tool 38 may be used to log the borehole 26 in the manner shown in FIG. 3. As indicated by a flowchart 70, the LWD tool 38 may be moved through the borehole 26 (block 72) and borehole images may be obtained at various depths (block 74). The compression electronics 62 may compress the borehole images (block 76). In some cases, the compression electronics 62 may compress the borehole images to a greater extent by exploiting certain characteristics of borehole images (e.g., symmetry or similarities in different DOI). The LWD tool 38 thereafter may transmit the compressed borehole images 40 to the surface (block 78) via any suitable telemetry system.

The compression electronics 62 may exploit characteristics of borehole images to efficiently compress the borehole images and send the compressed borehole images 40 to the surface. For example, symmetry in a borehole image may be exploited to reduce the redundancy of the dataset used to describe the image. Additionally or alternatively, the compression electronics 62 may equalize the borehole images dynamically before they are compressed. One example of a suitable method for compressing the borehole images is shown by a flow diagram 90 of FIG. 4. After providing an overview of the flow diagram 90, the individual components will be discussed in greater detail below.

Figure 4:
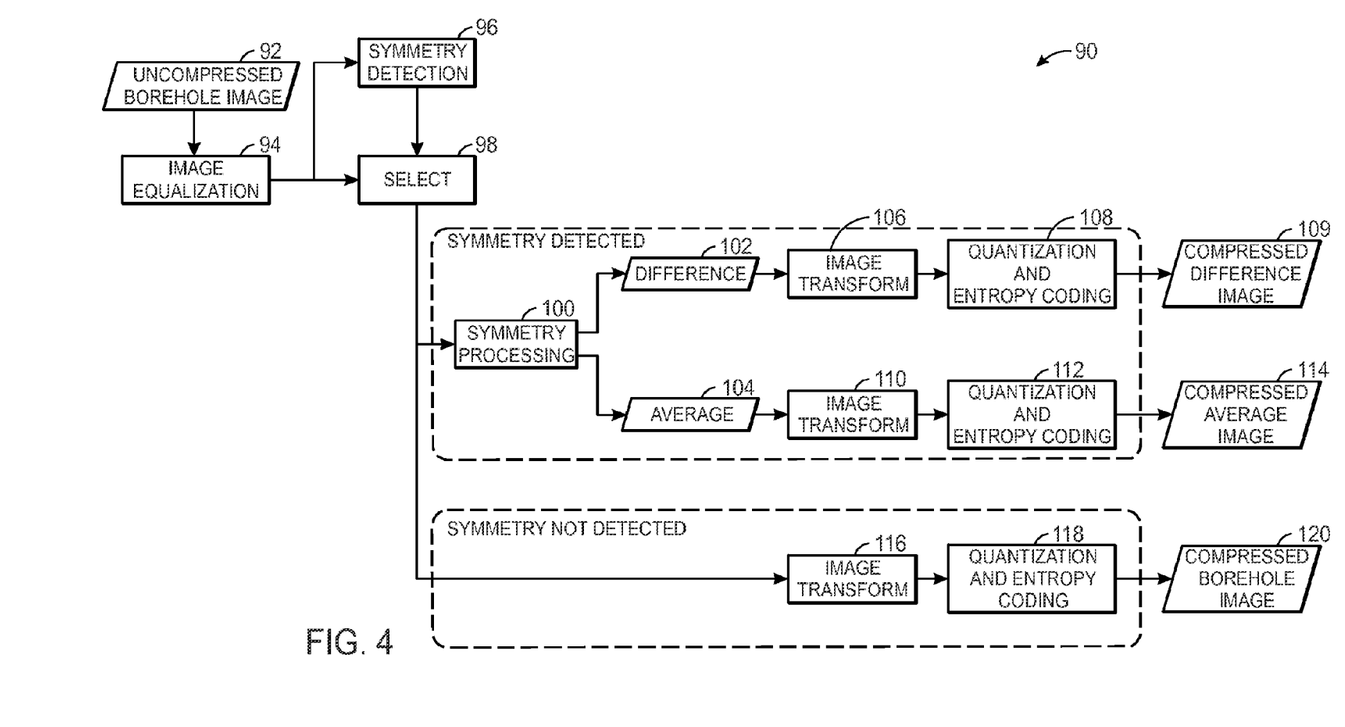
FIG. 4 is a flow diagram describing a method for compressing borehole images, in accordance with an embodiment.

The flow diagram 90 of FIG. 4 may begin by receiving an uncompressed borehole image 92. The borehole image 92 may by equalized (block 94) before further processing. In certain circumstances, characteristics of the formation 12 may cause the borehole image 92 to exhibit symmetry. Under these conditions, the symmetry of the borehole image may be exploited to increase compression efficiency. As such, symmetry of the borehole image 92 may be evaluated (block 96) and the equalized borehole image 92 may be routed (block 98) to different manners of compression depending on whether the borehole image has substantially one symmetry line.

When the borehole image is detected to be generally symmetric, the compression electronics 62 may perform symmetry processing (block 100). As will be discussed further below, the symmetry processing of block 100 may involve applying a transform, such as a Haar Discrete Wavelet Transform (DWT) to remove redundancy of the borehole image 92 along a symmetry line. This may result in a difference image 102 and an average image 104, which collectively may be compressed to a smaller size than that which would result by compressing the entire borehole image 92. The difference image 102 may undergo an image transform (block 106) and quantization and entropy coding (block 108) to be output as a compressed difference image 109, which may be transmitted up to the surface. The average image 104 may likewise undergo an image transform (block 110) before quantization and entropy coding (block 112), resulting in a compressed average image 114. The compressed difference image 109 and the compressed average image 114 may be decompressed at the surface. When the symmetry detection of block 96 does not identify symmetry in the borehole image, the entire borehole image may be compressed via an image transform (block 116) and quantization and entropy coding (block 118) to produce a compressed borehole image 120.

The image transform of blocks 106, 110, and 116 may be any suitable image transforms to reduce the transform coefficient correlation and may be, in some examples, a wavelet packets transform that is subsequently applied to the transform coefficients. The quantization and entropy coding of blocks 108, 112, and 118 may determine a bit rate allocation to obtain a bit stream.

The various blocks of the flow diagram 90 may be understood to be modular. At minimum, the flow diagram 90 may employ an image transform, quantization and entropy coding. The pre-processing steps may be used in various combinations. Exploiting a symmetry line as well as performing image equalization before further compression may improve the performance and/or results of the compression of the borehole image 92. The various blocks shown in the flow diagram 90 of FIG. 4 will now be described in greater detail.

Image Equalization (Block 94)

The compression electronics 62 may perform any suitable image equalization. By equalizing the borehole image 92, the dynamic range of the useful information of the borehole image 92 may be obtained before compression. This may reduce the amount of substantially useless information that would otherwise be compressed and transmitted up hole, thereby saving valuable transmission bandwidth. The image equalization of block 94 thus may assist the compression of the borehole image 92 because each input pixel value distribution may have a relatively large dynamic range. The image equalization of block 94 may take place using any suitable equalization technique.

For instance, the image equalization of block 94 may operate using a fixed pixel-by-pixel function. A fixed pixel-by-pixel function may include a compander or a log function. Examples include Mu-law and A-law companders, which may be of the sort used in audio compression.

In other examples, the image equalization of block 94 may perform a function or value mapping applied on a pixel-by-pixel basis that causes the output image color distribution to by optimized for display. The image equalization of block 94 thus may, additionally or alternatively, take one or more of the following forms:

Static. A first form, which may be referred to as static, involves block-by-block histogram-based equalization. Such equalization may take a block of pixels at a time, estimate the histogram distribution of pixel values, and derive an equalizer such that the output distribution is one of several chosen distributions.

Dynamic. A second form may be referred to as dynamic equalization. The dynamic equalization may derive a periodically updated histogram, and for each histogram, the equalization that best fits the histogram may be determined. A dynamic equalizer may be applied in a sliding-window fashion.

Parametric. A third form may be referred to as parametric equalization. The parametric equalization may define a mapping function parametrically. In one example, the parametric equalization may define boundary regions for mapping. The boundary may be updated periodically as new pixels are received.

Figure 5:
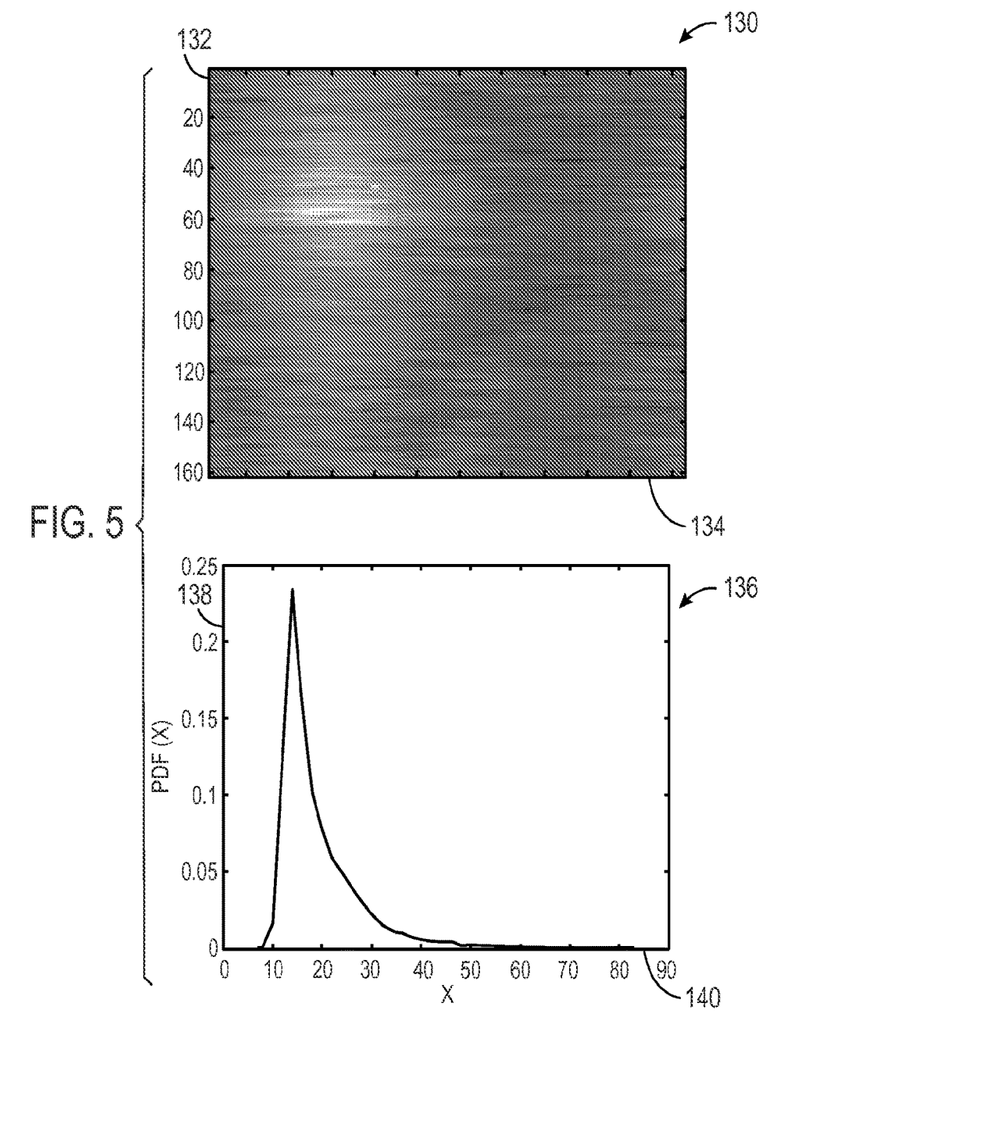
FIGS. 5 and 6 represent respective images before and after pre-compression image equalization, in accordance with an embodiment.
Figure 6:
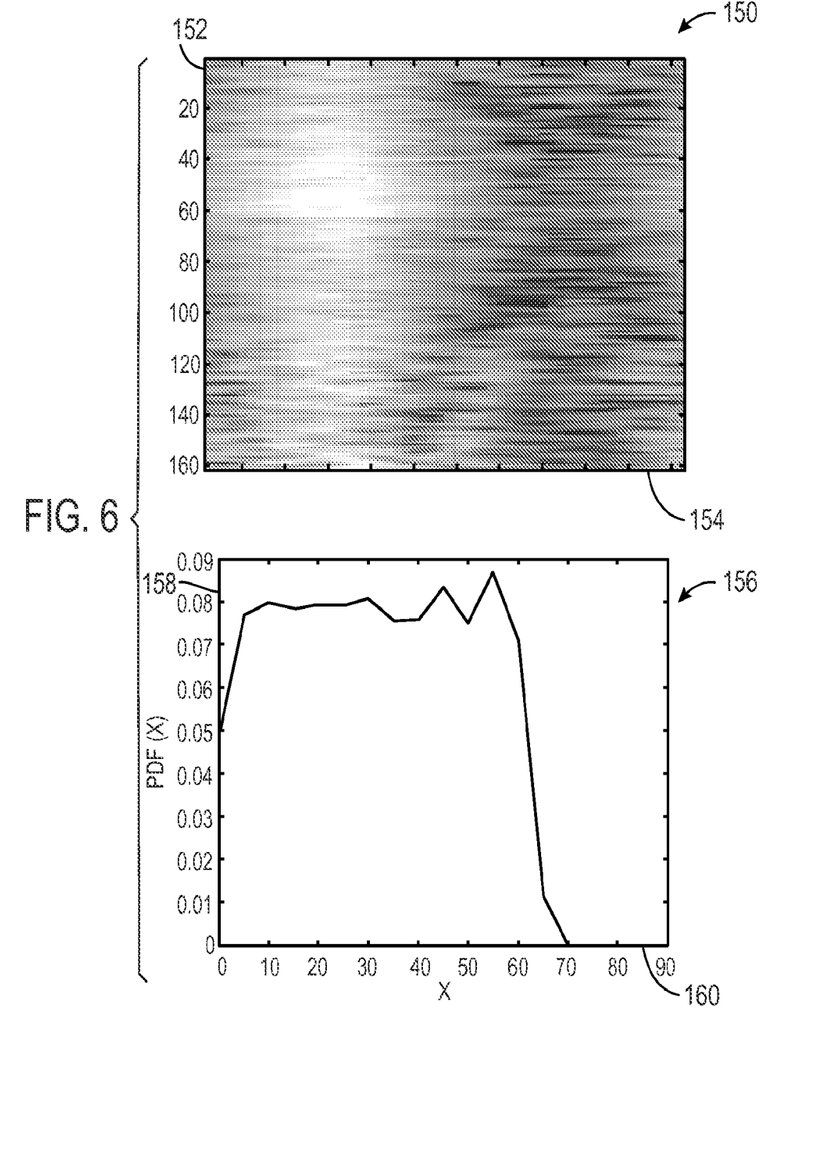

The image equalization of block 94 may increase the amount of useful information associated with a borehole image, as shown by example in FIGS. 5 and 6. In FIG. 5, a borehole image 130, which is shown to have a height 132 and a width 134, has associated with it a probability distribution function (pdf) plot 136 associated with the borehole image 130. The probability distribution function (pdf) plot 136 compares a probability distribution (ordinate 138) to a dynamic range of the borehole image 130 (abscissa 140). As seen in the probability distribution function (pdf) plot 136, the borehole image 130 shown in FIG. 5 has a relatively low dynamic range.

However, the dynamic range of the borehole image 130 may be improved when the borehole image 130 is equalized using an image equalization process such as those discussed above. An equalized borehole image 150, having a corresponding height 152 and width 154, may result as shown in FIG. 6. A corresponding probability distribution function (pdf) plot 156 associated with the equalized borehole image 150 compares a probability distribution (ordinate 158) to a dynamic range of the equalized borehole image 150 (abscissa 160). As seen in the probability distribution function (pdf) plot 156, the probability distribution of the equalized borehole image 150 is substantially equalized over a large dynamic range.

Symmetry Processing (Blocks 96 and 100)

Figure 7:
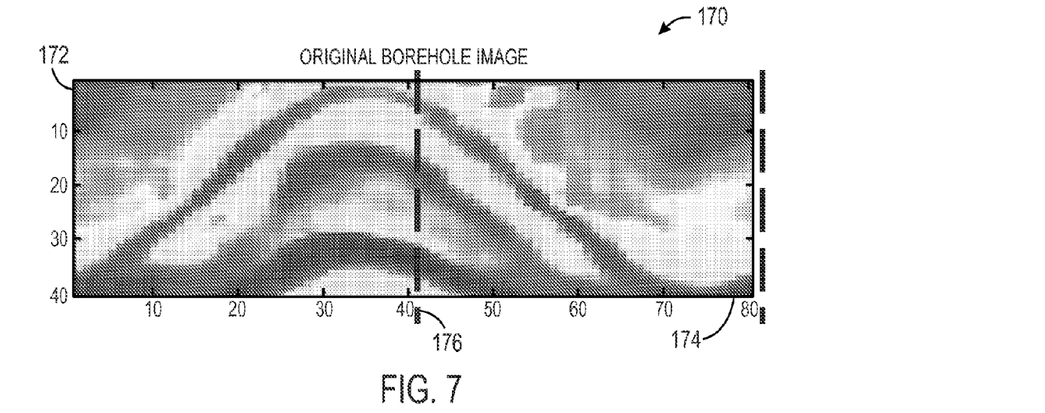
FIG. 7 is a an example of an uncompressed borehole image that may be processed to identify symmetry before compression, in accordance with an embodiment.

This disclosure notes that borehole images may have a symmetrical structure that can be exploited to improve efficiency. Indeed, as shown in FIG. 7, a borehole image 170, which may have a height 172 and a width 174, provides an example of a borehole image that shows signs of symmetry. The compression electronics 62 may identify the symmetry in the borehole image 170 by comparing left and right images that would result if the borehole image 170 were divided along a symmetry line 176. The symmetry line 176 may be moved to a number of selected points along the width 174 of the borehole image 170.

Figure 8:
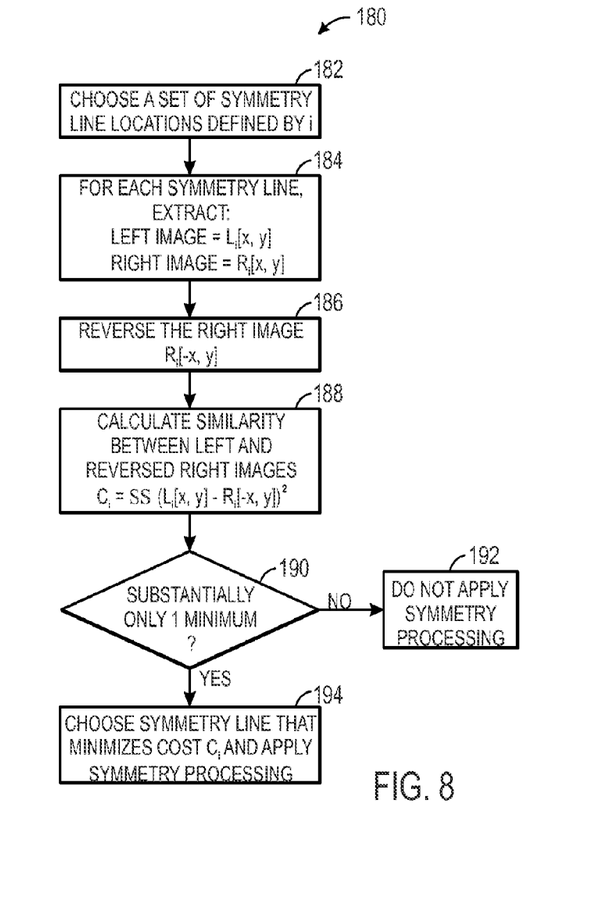
FIG. 8 is a flowchart describing a method for identifying whether a borehole image is symmetrical, in accordance with an embodiment.

For example, as shown by a flowchart 180 of FIG. 8, the compression electronics 62 may chose a set of symmetry line 176 locations defined by some value i (block 182). For each of the symmetry line 176 locations i, the compression electronics 62 may extract (block 184) a left image $L_i[x,y]$ and a right image $R_i[x,y]$. Note that, because the borehole image may represent a full azimuthal view of the borehole 26, the left image and right image may be selected around the symmetry line 176 location i so that an equal number of pixels is always on both sides of the symmetry line 176. The compression electronics 62 may reverse the right image (block 186) to obtain a reversed right image $R_i[-x,y]$. The compression electronics 62 may evaluate a degree of similarity between the left image and the reversed right image using a cost function that compares the left image and the reversed right image (block 188):

$$C_i = \Sigma\Sigma(L_i[x,y] - R_i[-x,y])^2$$

If there is not substantially only one minimum (decision block 190), the compression electronics 62 may not apply symmetry processing (block 192), because the borehole image may not have a substantially symmetrical character. If there is substantially only one minimum (decision block 190), however, this may imply that the borehole image may have symmetrical characteristics. As such, the compression electronics 62 may, under these circumstances, apply symmetry processing after selecting a symmetry line 176 location i that minimizes the cost function $C_i$ (block 194).

Figure 9:
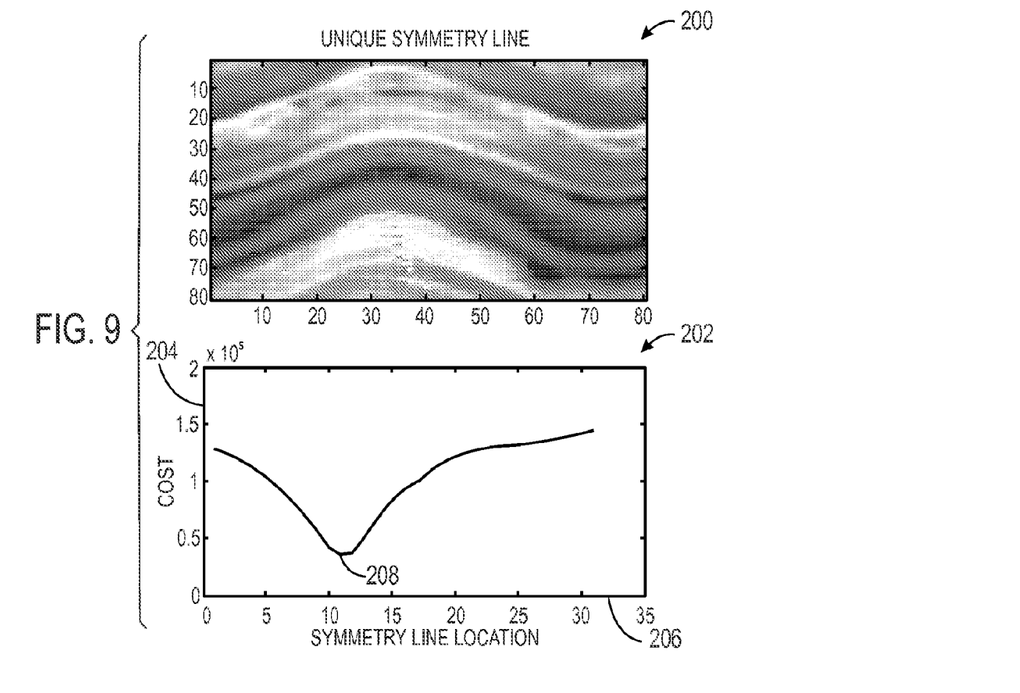
FIG. 9 is a symmetrical borehole image and a corresponding cost function, in accordance with an embodiment.
Figure 10:
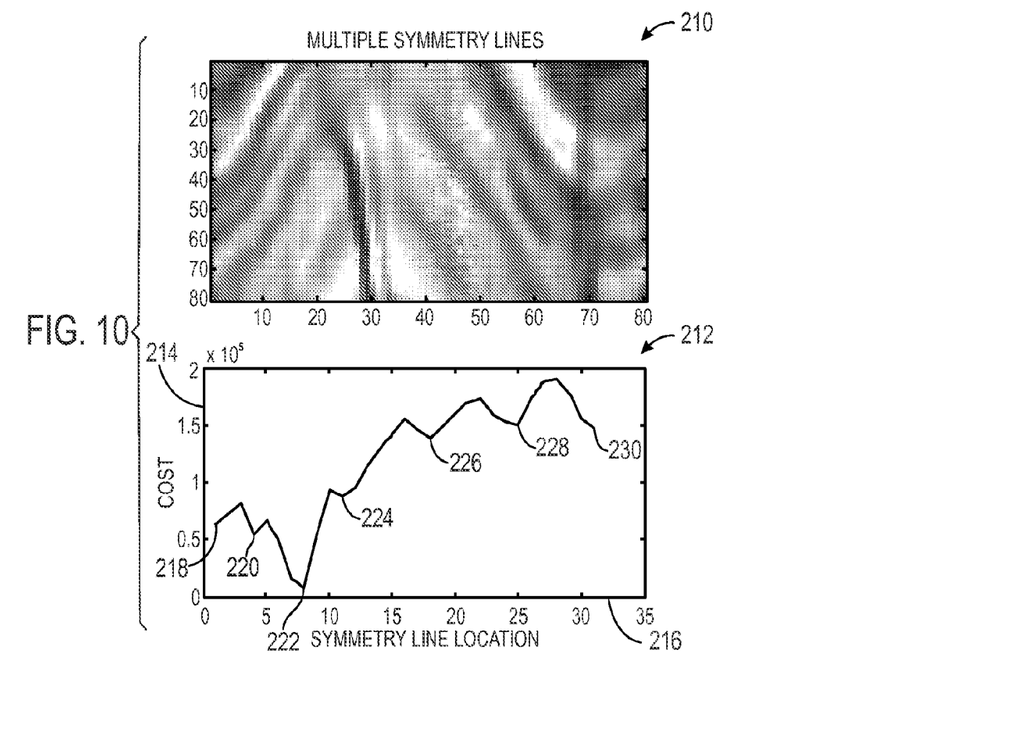
FIG. 10 is an asymmetrical borehole image and a corresponding cost function, in accordance with an embodiment.

The following example, provided in FIGS. 9 and 10, may illustrate the manner in which the compression electronics 62 may determine whether to apply symmetry processing to the borehole image. FIG. 9 presents an example of a symmetrical borehole image, while FIG. 10 presents an example of a borehole image with multiple symmetry lines. Considering FIG. 9, a borehole image 200 is shown to be generally symmetrical. As discussed above with reference to the flowchart 180 of FIG. 8, a cost function $C_i$ may be calculated for a variety of tested symmetry line 176 locations i in the borehole image 200. A plot 202 shows a plot of the cost (ordinate 204) in relation to symmetry line 176 locations i (abscissa 206) in the borehole image 200. The higher the value of the cost C, the less similar are the left and right images around the symmetry line. The lower the value of the cost C, the more similar are the left and right images around the symmetry line. As seen in the plot 202 of FIG. 9, the cost function $C_i$ of the symmetrical borehole image 200 has a single minimum at a point 208. The point 208 represents the symmetry line 176 about which left and right images are most symmetrical to one another.

In an asymmetrical borehole image 210 of FIG. 10, however, multiple symmetry lines may be apparent, suggesting that the borehole image 210 would not be a good candidate for the symmetry processing of block 100. As in the discussion of FIG. 9, a cost function $C_i$ may be calculated for a variety of tested symmetry line 176 locations i in the borehole image 210. A plot 212 shows a plot of the cost (ordinate 214) in relation to symmetry line 176 locations i (abscissa 216) in the borehole image 210. The higher the value of the cost C, the less similar are the left and right images around the symmetry line. The lower the value of the cost C, the more similar are the left and right images around the evaluated symmetry line 176. As seen in the plot 212, there are multiple minima in the plot 212, shown as minima 218, 220, 222, 224, 226, 228, and 230. The multiple lines of symmetry may be due, for example, to drilling induced fractures. In any case, the appearance of so many minima in the plot 212 of the cost function at the symmetry line 176 locations i of the borehole image 210 implies that there is not a symmetry in the borehole image 210 that can be exploited to increase the efficiency of the borehole image compression. As such, when the compression electronics 62 identify multiple minima, the compression electronics 62 may not perform the symmetry processing of block 100.

Figure 11:
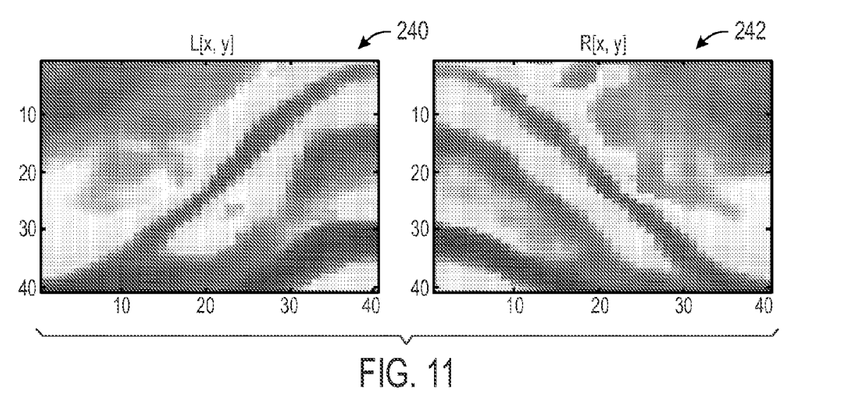
FIG. 11 is an example of the borehole image of FIG. 7 separated into left and right borehole images along a symmetry line, in accordance with an embodiment.
Figure 12:
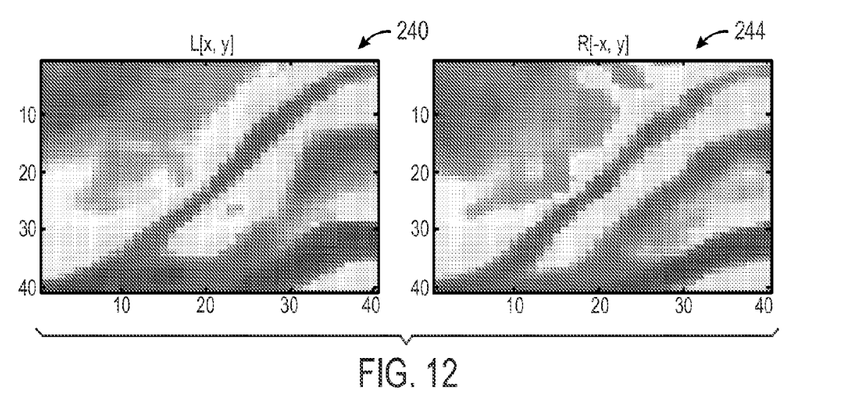
FIG. 12 is an example of the left and right borehole images of FIG. 11 after reversing the right image, in accordance with an embodiment.

When a borehole image is determined to be generally symmetrical, the symmetry processing of block 100 may take place. FIGS. 11-14 provide an example of the symmetry processing of block 100 using the example borehole image 170 first shown in FIG. 7. Indeed, FIG. 11 shows the borehole image 170 after it has been split into a left image 240 and a right image 242. Here, the left image 240 and the right image 242 are obtained around a symmetry line 176 that was identified as having the lowest cost function among all of those that were evaluated. In FIG. 12, the right image 240 has been reversed to produce a reversed right image 244.

Once the symmetry line is evaluated, the compression electronics 62 may reduce the redundancy in the dataset by using any suitable transform (e.g., a Haar transform). For example, a Haar transform may be applied on the left image $L[x,y]$ and the reversed right image as $R[-x,y]$. Using the Haar decomposition, the compression electronics 62 may obtain an average image $A[x,y]$ and a difference image $D[x,y]$ as follows:

$$A[x,y] = (L[x,y] + R[-x,y])/\sqrt{2}; \text{ and}$$

$$D[x,y] = (L[x,y] - R[-x,y])/\sqrt{2}.$$

Figure 13:
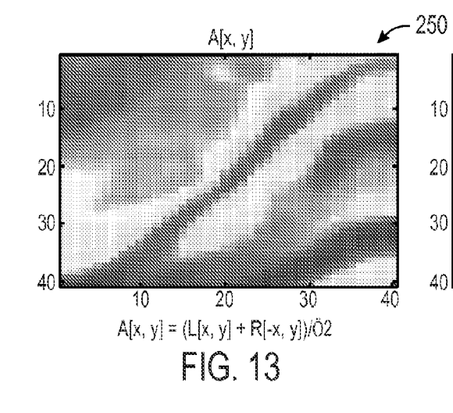
FIG. 13 is a example of an average image of the left and reversed right images of FIG. 12, in accordance with an embodiment.
Figure 14:
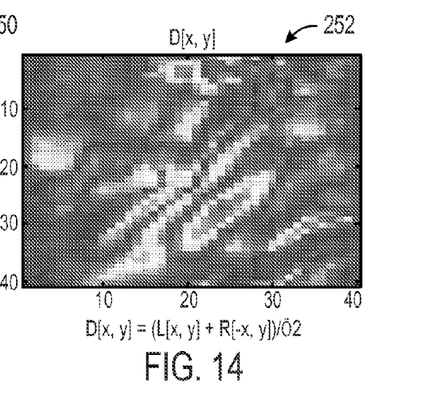
FIG. 14 is an example of a difference image of the symmetrical images of FIG. 12, in accordance with an embodiment.

The calculated difference image $D[x,y]$ may correspond to the difference image 102 of FIG. 4 discussed above. The calculated average image $A[x,y]$ may correspond to the average image 104 of FIG. 4 discussed above. Calculating these using the left image 240 and the reversed right image 244 of FIG. 12 may produce an average image 252 as shown in FIG. 13 and a difference image 254 as shown in FIG. 14. The goal of the transformation may be to obtain a difference component $D[x,y]$ that has a relatively low amount of energy. It may be noted that it is also possible that the input image contain more than one line of symmetry, as in the case of the asymmetrical borehole image 210 of FIG. 10. The multiple lines of symmetry in such an image may make it inefficient to split the original borehole image into components $A[x,y]$ and $D[x,y]$, since the component $D[x,y]$ may have a relatively high energy. To avoid such situations, as noted above, the compression electronics 62 may avoid performing the symmetry processing of block 100 when multiple lines of symmetry are detected.

Image Transform (Blocks 106, 110, and 116)

The image transform of blocks 106, 110, and 116 may be any suitable image transforms to further reduce redundancy of the dataset of the borehole images. One example of an image transform involves wavelet packets. Wavelet packets may efficiently capture horizontal/vertical features and are data adaptive. Wavelet packets is a generalization of the Discrete Wavelet Transform (DWT). Moreover, when the wavelet packets transform is combined with the symmetry processing of block 100, substantial efficiency gains may be achieved as compared to merely applying a regular wavelet transform.

Quantization and Entropy Coding (Blocks 108, 112, and 118)

The quantization and entropy coding of the transform coefficients in blocks 108, 112, and 118 of the flowchart 90 of FIG. 4 may efficiently allocate the total bit budget among the transform coefficients, which may substantially improve the compression performance. The quantization and entry coding of blocks 108, 112, and 118 may occur based on a technique referred to as Embedded Block Coding with Optimized Truncation of embedded bit streams (EBCOT). This technique is based on arithmetic coding, which may outperform Huffman coding, and adapts to the underlying data statistics. Rather than allocate bits exactly as may be called for using EBCOT, however, bit allocation may occur in an effort to achieve optimization of bit allocation between $A[x,y]$ and $D[x,y]$ frames (as opposed to separate encoding).

The correct bit allocation between A[x,y] and D[x,y] according to this disclosure may be implemented by aiming to minimize the distortion between the image downhole I[x,y] and decompressed image $I_R$ [x,y] on the surface. The distortion is defined in terms of mean squared error as:

$$D(R_A, R_D) = \frac{1}{M \times N} \sum \sum (I[x, y] - I_R[x, y])^2, \quad (1)$$

where M is the number of rows in the input image and N is the number of columns. It may be appreciated that distortion is a function of $R_A$ and $R_D$, which is the number of bits allocated to the average and difference image, respectively. By using Lagrangian multipliers, it can be shown that (1) is minimized by finding a variable λ which satisfies the following constraints:

$$\frac{\partial D_A(R_A)}{\partial R_A} = -\lambda, \quad (2)$$

$$\frac{\partial D_D(R_D)}{\partial R_D} = -\lambda, \text{ and} \quad (3)$$

$$R_A + R_D = R_T, \quad (4)$$

where $D_A(.)$ and $D_D(.)$ are the distortion in the average and difference image, respectively. By varying λ, the optimal allocation rates $R_A$ and $R_B$ can be found using (2) and (3). The goal is hence to find a λ which satisfies (4). This problem can be solved by using the bisection algorithm.

Compression Involving Multiple Images of Different DOI

In addition to exploiting the symmetrical nature of many borehole images, the compression electronics 62 may also exploit similarities between multiple images obtained at various depths of investigation (DOI) to improve image compression. For example, a flow diagram 260 shown in FIG. 15 describes a manner in which two borehole images at different depths of investigation (DOI) can be compressed and transmitted to the surface with a reduced size by exploiting the similarities between these images. The flow diagram 260 of FIG. 15 may be performed additionally or alternatively to the compression discussed above with reference to FIG. 4.

Figure 15:
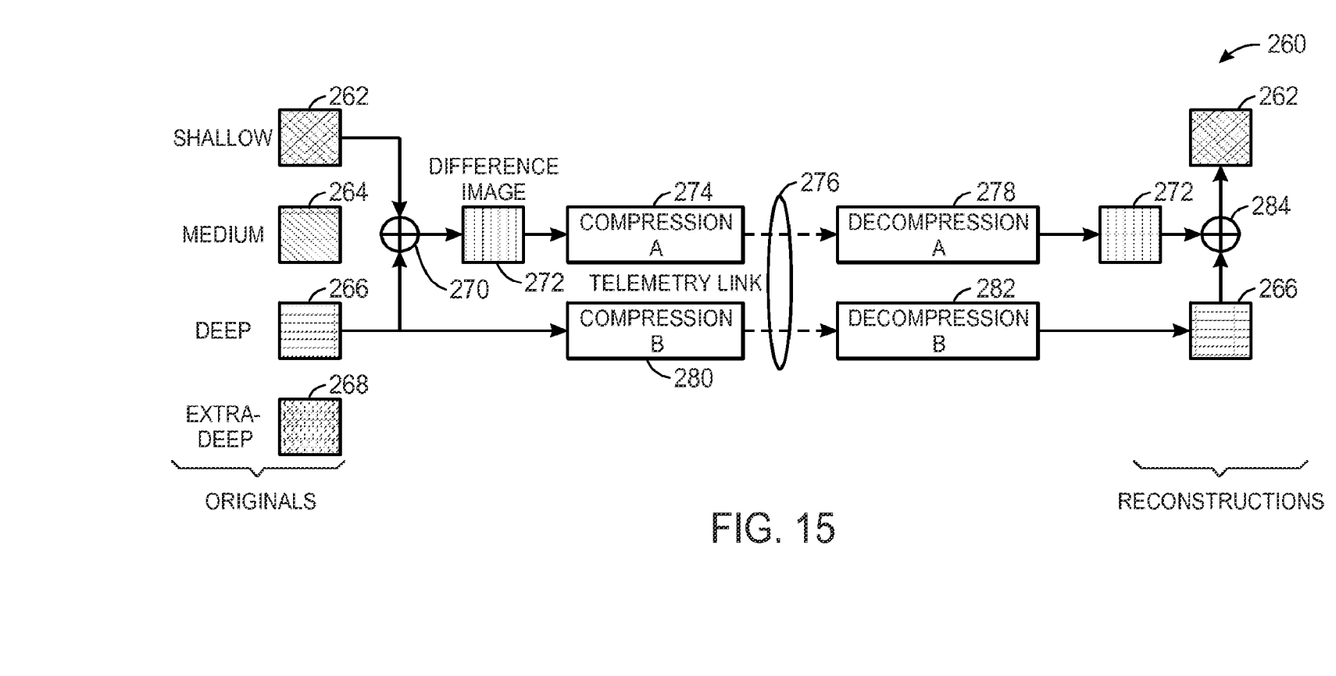
FIG. 15 is a flow diagram of a method for compressing borehole images from multiple depths of investigation (DOI), in accordance with an embodiment.

In the flow diagram 260, multiple borehole images may be obtained at different DOI. These may include a shallow image 262, a medium-depth image 264, a deep image 266, and/or an extra-deep image 268. Any two of these images 262, 264, 266, and/or 268 may be compared in a difference block 270, which may produce a difference image 272. In the example of FIG. 15, the shallow image 262 is compared to the deep image 266, but any suitable images from different DOI may be employed. Recalling that images at different DOI may be obtained substantially simultaneously, the images 262, 264, 266, and/or 268 may have substantial similarities even if they are not identical. As a result, the difference image 272 may include a relatively low amount of energy in relation to an original image. For example, the difference image 272 may represent approximately one-fifth to one-fourth of the energy that is to be compressed in the corresponding non-difference-image (e.g., the deep image 266, in the example of FIG. 15). In other words, when one borehole image obtained at one DOI is going to be compressed and transmitted to the surface, adding another borehole image from another DOI may add comparatively little cost in terms of data transmission bandwidth.

To transmit both the shallow image 262 and the deep image 266, the difference image 272 may be compressed (block 274) and transmitted over a telemetry link 276 before being decompressed (block 278) at the surface and recovered. Likewise, the deep image 266 may be compressed (block 280) and transmitted through the telemetry link 276 before being decompressed (block 282) at the surface and recovered. By adding the difference image 272 to the deep image 266 (addition block 284), the shallow image 262 can be recovered.

Figure 16:
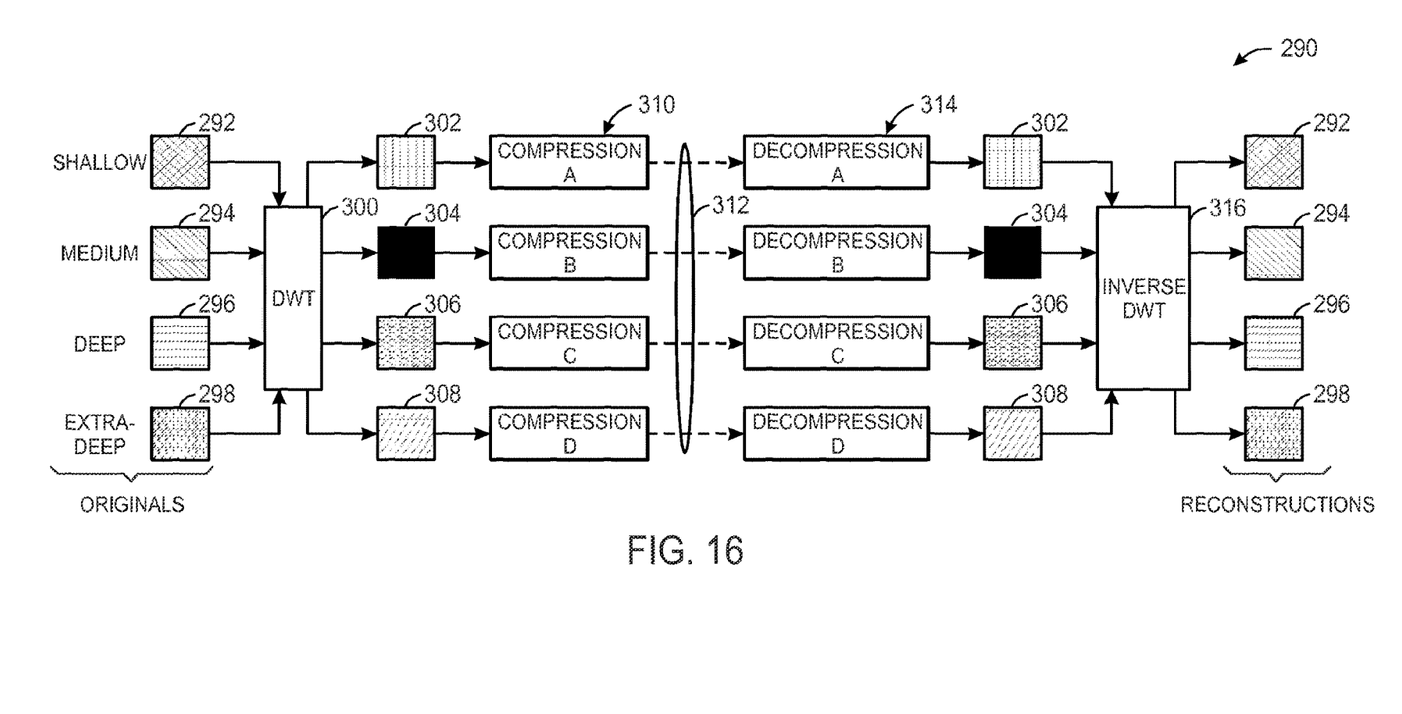
FIG. 16 is a flow diagram of a generalized method for compressing borehole images from multiple depths of investigation (DOI), in accordance with an embodiment.

The flow diagram 260 of FIG. 15 may be generalized to transmit any suitable number of borehole images at different depths of investigation (DOI) in a flow diagram 290 of FIG. 16. In the flow diagram 290, a shallow image 292, a medium-depth image 294, a deep image 296, and/or an extra-deep image 298 may be obtained, all of which may be transmitted up to the surface. Specifically, a transform, such as a discrete wavelet transform (DWT) 300, may be applied to the set of the images 292, 294, 296, and/or 298 to produce a set of transformed images 302, 304, 306, and/or 308. The transformed images 302, 304, 306, and/or 308 may be compressed (blocks 310) using any suitable compression, including the compression discussed above, before being transmitted across a telemetry link 312, decompressed (blocks 314), and recovered. By applying an inverse transform, such as an inverse discrete wavelet transform (DWT) 316 to the set of transformed images 302, 304, 306, and/or 308, the original images 292, 294, 296, and/or 298 may be recovered at the surface.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A method for obtaining borehole images at a surface installation while a borehole-imaging downhole tool is logging a borehole, the method comprising:
   while the downhole tool is disposed in the borehole:
      obtaining a first borehole image at a first depth of investigation using the borehole-imaging downhole tool;
      compressing the first borehole image using downhole compression electronics to obtain a first compressed borehole image, wherein compressing the first borehole image comprises exploiting a symmetry characteristic of the first borehole image to increase compression efficiency; and
      transmitting the first compressed borehole image to the surface installation via a telemetry system,
      wherein compressing the first borehole image comprises determining whether the symmetry characteristic is present in the first borehole image and, if so, exploiting the symmetry characteristic of the first borehole image to increase compression efficiency,
      wherein determining whether the symmetry characteristic is present comprises:
         selecting a set of symmetry line test locations in the first original borehole image;
         for each of the symmetry line test locations:
            extracting a first half image on a first side of the symmetry line test location;
            extracting a second half image on a second side of the symmetry line test location;

reversing the second half image to obtain a reversed second half image;

determining a similarity value between the first half image and the reversed second half image;

identifying one or more minima in a set of similarity values for the symmetry line test locations;

determining that the symmetry characteristic is present when the one or more minima include only one minimum; and determining that the symmetry characteristic is not present when the one or more minima include more than one minimum.

2. The method of claim 1, wherein the first borehole image is compressed and sent to the surface installation in substantially real time.

3. The method of claim 1, wherein determining the similarity value between the first half image and the reversed second half image for each of the set of the symmetry line test locations comprises determining a cost function value relating to for each of the set of the symmetry line test locations.

4. The method of claim 3, wherein the cost function values are determined according to the following equation:

$$C_i = \Sigma\Sigma(L_i[x,y] - R_i[-x,y])^2,$$

where $C_i$ represents the cost function value for a given symmetry line test location i, $L_i[x,y]$ represents the first half image for the given symmetry line test location i, and $R_i[-x,y]$ represents the reversed second half image for the given symmetry line test location i.

5. The method of claim 1, wherein compressing the first borehole image comprises exploiting the symmetry characteristic by obtaining an average image and a difference image from two half images extracted from the first borehole image along a symmetry line and compressing each of the average image and the difference image to obtain the first compressed borehole image.

6. The method of claim 5, wherein the average image and the difference image are determined by applying a transform to a first forward half image and a second reverse half image of the two half images.

7. The method of claim 6, wherein the transform comprises a Haar transform.

8. The method of claim 6, wherein the average image and difference image are determined as follows:

$$A[x,y] = (L[x,y] + R[-x,y])/\text{sqrt}(2); \text{ and}$$

$$D[x,y] = (L[x,y] - R[-x,y])/\text{sqrt}(2),$$

where $A[x,y]$ represents the average image, $D[x,y]$ represents the difference image, $L[x,y]$ represents the first forward half image, and $R[-x,y]$ represents the second reverse half image.

9. The method of claim 1, wherein compressing the first borehole image comprises applying a wavelet packets image transformation.

10. The method of claim 1, wherein compressing the first borehole image comprises applying equalization that comprises performing a function or value mapping applied on a pixel-by-pixel basis.

11. The method of claim 10, wherein the image equalization comprises a static, block-by-block histogram-based equalization.

12. The method of claim 10, wherein the image equalization comprises a dynamic equalization that equalizes the image based at least in part on a periodically updated histogram.

13. The method of claim 10, wherein the image equalization comprises a parametric equalization that defines a mapping function parametrically.

14. A downhole tool comprising:

one or more borehole imaging components configured to obtain one or more borehole images;

compression electronics configured to compress the one or more borehole images based at least in part on a symmetry characteristic of the one or more borehole images, wherein compressing the first borehole image comprises determining whether the symmetry characteristic is present in the first borehole image and, if so, exploiting the symmetry characteristic of the first borehole image to increase compression efficiency, wherein determining whether the symmetry characteristic is present comprises:

selecting a set of symmetry line test locations in the first original borehole image;

for each of the symmetry line test locations:

extracting a first half image on a first side of the symmetry line test location;

extracting a second half image on a second side of the symmetry line test location;

reversing the second half image to obtain a reversed second half image;

determining a similarity value between the first half image and the reversed second half image;

identifying one or more minima in a set of similarity values for the symmetry line test locations;

determining that the symmetry characteristic is present when the one or more minima include only one minimum; and determining that the symmetry characteristic is not present when the one or more minima include more than one minimum; and a telemetry system configured to transmit the compressed one or more borehole images to a surface installation.

15. The downhole tool of claim 14, wherein the downhole tool comprises a resistivity tool, an acoustic imaging tool, a caliper tool, a radiation-based imaging tool, or any combination thereof.

16. The method of claim 1, wherein compressing the first borehole image comprises exploiting the symmetry of the first image and exploiting a similarity of the first borehole image with a second borehole image taken at a second depth of investigation substantially at the same time as the first borehole image to increase compression efficiency.

* * * * *